United States Patent
Duan et al.

(10) Patent No.: US 10,099,247 B2
(45) Date of Patent: Oct. 16, 2018

(54) ANTI-REFLECTIVE COATING FOR SAPPHIRE

(71) Applicant: Honeywell International Inc., Morris Plains, NJ (US)

(72) Inventors: Huifeng Duan, Shanghai (CN); Yanming Shen, Shanghai (CN); Ya Qun Liu, Shanghai (CN); Hong Min Huang, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/183,055

(22) Filed: Jun. 15, 2016

(65) Prior Publication Data

US 2017/0017017 A1      Jan. 19, 2017

Related U.S. Application Data (60) Provisional application No. 62/192,148, filed on Jul. 14, 2015.

(51) Int. Cl.
*B05D 3/02* (2006.01)
*B05D 1/00* (2006.01)
*G02B 1/111* (2015.01)
*G02B 1/14* (2015.01)

(52) U.S. Cl.
CPC .......... *B05D 3/0272* (2013.01); *B05D 1/005* (2013.01); *G02B 1/111* (2013.01); *G02B 1/14* (2015.01)

(58) Field of Classification Search
CPC ...... B05D 3/0272; B05D 1/005; G02B 1/111; G02B 1/14

USPC ........................................................ 359/601
See application file for complete search history.

(56) References Cited

U.S. PATENT DOCUMENTS

| 5,178,955 | A  | 1/1993 | Aharoni et al. |
| 8,133,573 | B2 | 3/2012 | Jilavi et al. |
| 2008/0160257 | A1 | 7/2008 | Takada et al. |
| 2009/0026924 | A1 | 1/2009 | Leung et al. |
| 2014/0011019 | A1 | 1/2014 | Mukhopadhyay et al. |

(Continued)

FOREIGN PATENT DOCUMENTS

| CN | 103640273 A | 3/2014 |
| CN | 104155712 A | 11/2014 |

(Continued)

OTHER PUBLICATIONS

International Search Report and Written Opinion issued in PCT/US2016/040958, dated Oct. 17, 2016, 11 pages.

(Continued)

*Primary Examiner* — Bumsuk Won
*Assistant Examiner* — Wen Huang
(74) *Attorney, Agent, or Firm* — Faegre Baker Daniels LLP (57) ABSTRACT

A coated substrate includes a sapphire substrate and an anti-reflective coating comprising a silicon-based material, wherein the anti-reflective coating has refractive index of 1.23 to 1.45 and a Mohs hardness of at least 4. A method of coating a sapphire substrate with an anti-reflective coating includes applying a liquid formulation to a sapphire substrate to form a coated substrate, and curing the coated substrate at a temperature of at least 500° C. to form an anti-reflective layer on the sapphire substrate.

19 Claims, 6 Drawing Sheets

(56) References Cited

U.S. PATENT DOCUMENTS

2014/0272298 A1   9/2014  Memering et al.
2015/0217532 A1*  8/2015  Kuraseko ................ B32B 27/00
                                                          156/230

FOREIGN PATENT DOCUMENTS

KR      2014055380  A     5/2014
WO      2014139592  A1    9/2014

OTHER PUBLICATIONS

Feng et al. Improvement of the Infrared Transmission of Sapphire by SiO2 Films. Journal of Inorganic Materials, vol. 22, No. 3 (May 2007), pp. 529-533.

Feng et al. Optical Properties of Silica Films Prepared on Sapphire. College of Materials Science and Engineering, Northwestern Polytechnical University: Materials Science Forum vol. 475-479 (2005) pp. 3709-3712. Retrieved from the Internet <www.scientific.net/MSF.475-479.3709>.

Madocks, John et al. Durable Neutral Color Anti-Reflective Coating for Mobile Displays SVC Bulletin, Fall 2014, pp. 32-34.

Ness, Dale et al. Thermal robustness of Ion Beam Sputtered TiO2, TiO2/Al2O3 and Al2O3/SiO2 IR Anti-Reflective coatings on YAG and Sapphire substrates, SPIE digital library [online], retrieved on May 7, 2015. Retrieved from the Internet <http://proceedings.spiedigitallibrary.org/>.

Wang, Ying-jian et al. Anti-reflection films coated on sapphier for high power laser system. High Power Laser and Pracitce Beams, vol. 16, No. 1 (Jan. 2004), pp. 55-58.

Wang, Ying-jian et al. Study of Anti-reflection Films Coated on the Sapphire Window. Chinese Journal of Lasers, vol. A28, No. 8 (Aug. 2001), pp. 765-768.

International Preliminary Report on Patentability issued in PCT/US20161040958, completion date Nov. 3, 2017, 5 pages.

* cited by examiner

ANTI-REFLECTIVE COATING FOR SAPPHIRE

CROSS-REFERENCE TO RELATED APPLICATIONS

This application claims priority to U.S. Provisional Patent Application Ser. No. 62/192,148, filed Jul. 14, 2015, the disclosure of which is expressly incorporated herein by reference in its entirety.

FIELD OF THE INVENTION

The present disclosure relates generally to anti-reflective coatings for optically transparent elements and more particularly to anti-reflective polysiloxane coatings for sapphire substrates.

BACKGROUND

The use of sapphire wafers for a lens, such as a cover lens for mobile phones, has advantages over silica glass, such as higher mechanical strength and deformation resistance. However, the light transmittance of pure sapphire is only about 86%, much lower than 92% for silica glass.

Anti-reflective coatings are used to increase light transmittance through an optically transparent substrate, such as glass or sapphire, by reducing the reflected fraction of incident light that passes through the substrate.

A single layer of transparent material having a refractive index between the refractive index of air, 1.0, and the refractive index of sapphire, 1.77, can provide an anti-reflective effect. However, the best effect will typically be achieved with a refractive index close to about 1.33.

In addition to a low refractive index, the anti-reflective coating must also have good film strength and a high hardness. However, with typical known polysiloxane coatings, it is difficult to obtain a relatively low refractive index for use with sapphire while also providing good film strength and high hardness.

Some typical anti-reflective coatings are provided using physical deposition of multiple layers of the coating to provide high uniformity. However, the process is typically complex, expensive, and provides poor film strength.

Improvements in the foregoing are desired.

SUMMARY

The present disclosure provides anti-reflective coatings for sapphire substrates and methods for coating such substrates.

In one exemplary embodiment, a coated substrate is provided. The coated substrate includes a sapphire substrate and an anti-reflective coating. The anti-reflective coating includes a silicon-containing material. The anti-reflective coating has refractive index of 1.23 to 1.45 and a Mohs hardness of at least 4.

In one more particular embodiment, the coated substrate has an average transmittance to light in the visible optical wavelength range from 380 to 800 nm of 90% or higher. In one more particular embodiment of any of the above embodiments, the anti-reflective coating has a Mohs hardness of 4 to 8. In one more particular embodiment of any of the above embodiments, the anti-reflective coating has a refractive index 1.30 to 1.35. In one more particular embodiment of any of the above embodiments, the anti-reflective coating has a thickness from 50 nm to 150 nm. In one more particular embodiment of any of the above embodiments, the anti-reflective coating has a water contact angle of water contact angle of less than 10°.

In one more particular embodiment of any of the above embodiments, the silicon-containing material is formed from one or more crosslinkable siloxane oligomers. In a more particular embodiment, the crosslinkable siloxane oligomers comprise methylsiloxane oligomers. In an even more particular embodiment, the methylsiloxane oligomers have a weight average molecular weight 1000 Dalton to 5000 Dalton.

In one more particular embodiment of any of the above embodiments, the anti-reflective coating is formed by curing the crosslinkable siloxane oligomers at a temperature of at least 500° C. to form an anti-reflective layer on the sapphire substrate. In one even more particular embodiment, the anti-reflective coating is formed by curing the crosslinkable siloxane oligomers at a temperature of 500° C. to 800° C. for 1 minute to 60 minutes, or more particularly 3 minutes to 15 minutes. In another even more particular embodiment, the anti-reflective coating is formed by curing the crosslinkable siloxane oligomers at a temperature of at least 700° C.

In one more particular embodiment of any of the above embodiments, the sapphire substrate has opposing first and second surfaces, the anti-reflective coating being in contact with the first surface of the sapphire substrate, the coated substrate further comprising a second anti-reflective coating in contact with the second surface of the sapphire substrate. In one even more particular embodiment of any of the above embodiments, the second anti-reflective coating has refractive index of 1.23 to 1.45 and a Mohs hardness of at least 4.

In one more particular embodiment of any of the above embodiments, the coated substrate includes an anti-fingerprinting coating in contact with the anti-reflective coating. In one even more particular embodiment of any of the above embodiments, the anti-fingerprinting layer has a water contact angle from 90° to 150°. In another more particular embodiment of any of the above embodiments, the anti-fingerprinting layer has an oleic acid contact angle from 60° to 90°.

In one embodiment, a device is provided. The device comprises at least one coated substrate according to any of the above embodiments. In a more particular embodiment, the device is at least one of a display, a camera, a lens, or optical equipment. In an even more particular embodiment, the device is a phone, a tablet computer, a notebook computer, or a watch.

In one embodiment, a method of coating a sapphire substrate with an anti-reflective coating is provided. The method includes providing a sapphire substrate and applying a liquid formulation to the substrate to form a coated substrate. The liquid formulation comprises a cross-linkable silicon-based material and a solvent. The method further includes curing the coated substrate at a temperature of at least 500° C. to form an anti-reflective layer on the sapphire substrate.

In one more particular embodiment, applying the liquid formulation comprises spin-coating the liquid formulation on to the substrate. In an even more particular embodiment, the liquid formulation is spin-coated at a speed from about 2000 rpm to about 5000 rpm.

In one more particular embodiment of any of the above embodiments, curing the coated substrate includes heating the coated substrate at a temperature of 500° C. to 800° C. for 3 minutes to 15 minutes. In another more particular embodiment of any of the above embodiments, curing the coated substrate includes heating the coated substrate at a temperature of at least 700° C.

In one more particular embodiment of any of the above embodiments, the method further includes baking the coated substrate to remove at least a portion of the solvent prior to curing the coated substrate. In an even more particular embodiment, baking the coated substrate includes heating the coated substrate at a temperature of 80° C. to 250° C. for 3 minutes to 15 minutes.

In one more particular embodiment of any of the above embodiments, the solvent is selected from the group consisting of ethanol, isopropyl alcohol, acetone, methanol, n-propanol, n-butanol, water, methyl ethyl ketone, diethyl ketone, butyl acetate, ethyl acetate, propylene glycol methyl ether acetate, and mixtures thereof.

In one more particular embodiment of any of the above embodiments, the silicon-based materials are formed from one or more crosslinkable siloxane oligomers. In a more particular embodiment, the crosslinkable siloxane oligomers comprise methylsiloxane oligomers. In an even more particular embodiment, the methylsiloxane oligomers have a weight average molecular weight of 1000 Dalton to 5000 Dalton.

In one more particular embodiment of any of the above embodiments, the crosslinkable silicon-based material is provided as plurality of particles having a particle diameter from 0.1 nm to 50 nm.

In one more particular embodiment of any of the above embodiments, the crosslinkable silicon-based material comprises 1 wt. % to 20 wt. % of the total weight of the liquid formulation.

In one more particular embodiment of any of the above embodiments, the solvent is selected from the group consisting of water, ethanol, isopropyl alcohol, acetone, methanol, n-propanol, methyl ethyl ketone, diethyl ketone, butyl acetate, ethyl acetate, propylene glycol methyl ether acetate, and mixtures thereof.

In one more particular embodiment of any of the above embodiments, the solvent comprises 80 wt. % to 99 wt. % of the total weight of the liquid formulation.

In one more particular embodiment of any of the above embodiments, the anti-reflective layer has a thickness from 50 nm to 150 nm. In one more particular embodiment of any of the above embodiments, the anti-reflective layer has a refractive index of 1.23 to 1.45. In one more particular embodiment of any of the above embodiments, the anti-reflective layer has a Mohs hardness of at least 4.

In one more particular embodiment of any of the above embodiments, the sapphire substrate has opposing first and second surfaces, and applying the liquid formulation to the substrate includes applying the liquid formulation to the first surface of the sapphire substrate. The method further includes applying a second liquid formulation to the second surface of the sapphire substrate and curing the second liquid formulation to form a second anti-reflective layer on the sapphire substrate. In one more particular embodiment of any of the above embodiments, the method includes baking the coated substrate to remove at least a portion of the solvent prior to applying the second liquid formulation. In one more particular embodiment of any of the above embodiments, the second anti-reflective layer has a thickness from 50 nm to 150 nm. In one more particular embodiment of any of the above embodiments, the second anti-reflective layer has a refractive index of 1.23 to 1.45. In one more particular embodiment of any of the above embodiments, the second anti-reflective layer has a Mohs hardness of at least 4.

In one more particular embodiment of any of the above embodiments, the method further includes applying an anti-fingerprinting layer over the coated substrate. In one even more particular embodiment of any of the above embodiments, the anti-fingerprinting layer has a water contact angle from 90° to 150°. In another more particular embodiment of any of the above embodiments, the anti-fingerprinting layer has an oleic acid contact angle from 60° to 90°.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Corresponding reference characters indicate corresponding parts throughout the several views. The exemplifications set out herein are provided to illustrate certain exemplary embodiments and such exemplifications are not to be construed as limiting the scope in any manner.

DETAILED DESCRIPTION

Figure 1:
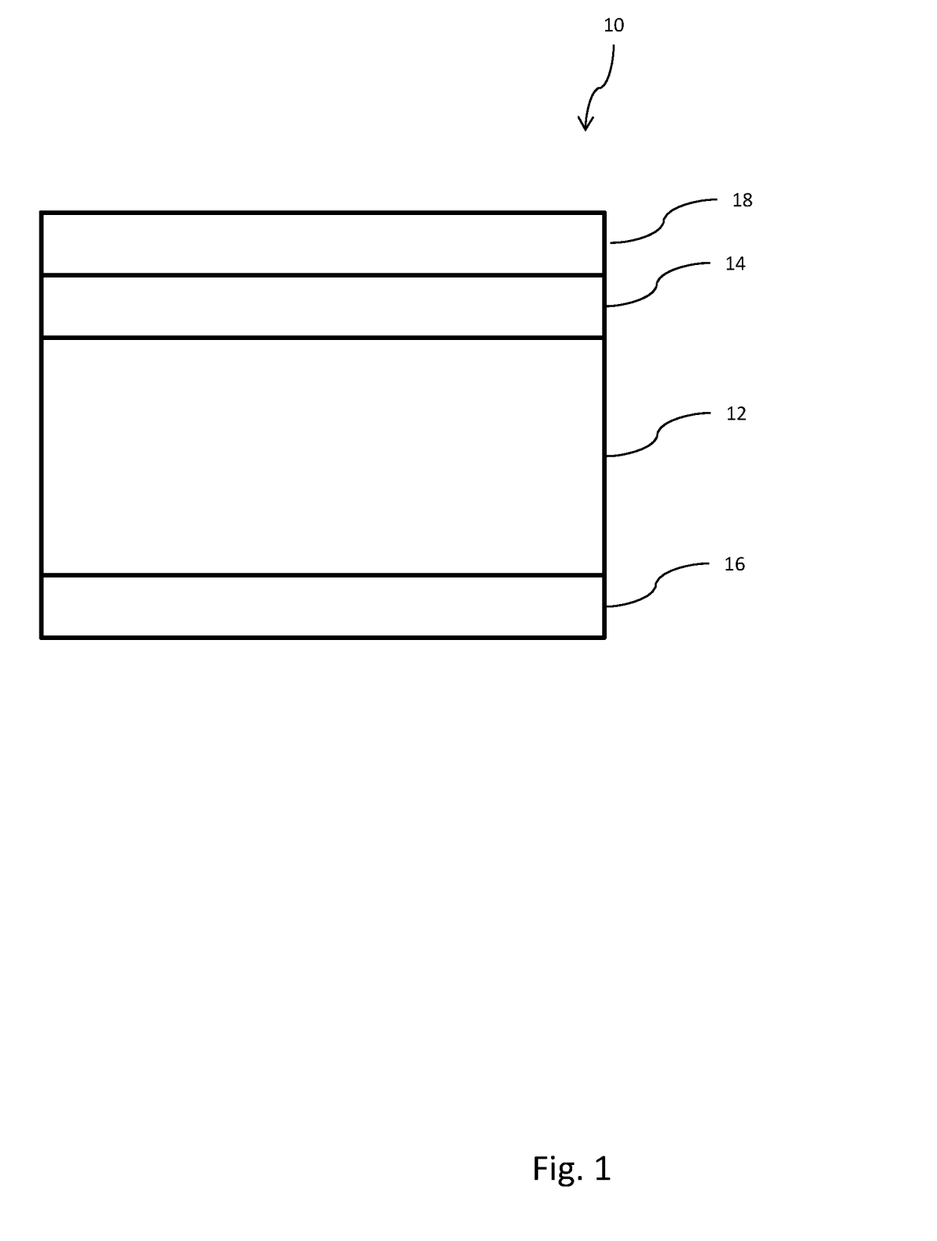
FIG. 1 illustrates an exemplary coated sapphire wafer.

Referring first to FIG. 1, an exemplary coated sapphire wafer 10 is illustrated. In some exemplary embodiments, the coated sapphire wafer 10 comprises a portion of a display, a camera, a lens, or other optical equipment.

As illustrated in FIG. 1, the coated sapphire wafer 10 comprises a sapphire wafer 12, first coating layer 14 applied to a first surface of sapphire wafer 12, and a second coating layer 16 applied to a second surface of sapphire wafer 12.

Although illustrated in FIG. 1 as including both a first coating layer 14 and a second coating layer 16, in other embodiments, coated sapphire wafer 10 includes only a first coating layer 14.

As also illustrated in FIG. 1, in some embodiments, the anti-reflective layer is provided as a single layer first coating layer 14 and/or single layer second coating layer 16. In some exemplary embodiments, first coating layer 14 and/or second coating layer 16 do not comprise multiple layers of the anti-reflective coating.

In some embodiments, the coated sapphire wafer includes one or more additional layers 18, such as an anti-fingerprint coating, applied to the first coating layer 14 and/or the second coating layer 16. Exemplary anti-fingerprint coatings include 2634 or 2634p coatings available from Dow Corning, KY-100 series coating materials available from Shin-Etsu, SH-HT coating material available from DON Co., LTD., and OPTOOL DSX coatings available from Daikin. Additional exemplary anti-fingerprint coatings are disclosed in PCT Publication WO 2015/038454, entitled POLY FLUORINE-CONTAINING SILOXANE COATINGS, the disclosure of which is hereby incorporated by reference in its entirety.

In one embodiment, the anti-fingerprint coatings comprise a poly fluorine-containing siloxane coating. The composition includes a polymer of Formula (I), shown below, at least one organic solvent, and optionally at least one additive:

(I)

wherein:
R is a hydrogen atom, an alkyl or aryl group having 1 to 10 carbon atoms, a fluorine-substituted alkyl or aryl group having 1 to 10 carbon atoms;
Rf is a linear or branched perfluoro-alkyl group represented by the formula F—$(C_gF_{2g})$—, where g is an integer from 1 to 10;
$W^1$, $W^2$ are each independently a perfluoroether-containing organic group;
$Q^1$, $Q^2$, $Q^3$, $Q^4$ are each independently an organic linking group linking a Si element to a fluorinated group; and
a, b, c, d, e are each independently an integer from 0 to 1000, the sum of the integers a, b, and c being greater than or equal to 2.

Although illustrated in FIG. 1 as including a single additional layer 18 on first coating layer 14, in other embodiments, coated sapphire wafer 10 includes multiple additional layers 18 on first coating layer 14, one or more additional layers 18 on second coating layer 16, or no additional layer 18.

Figure 2A:
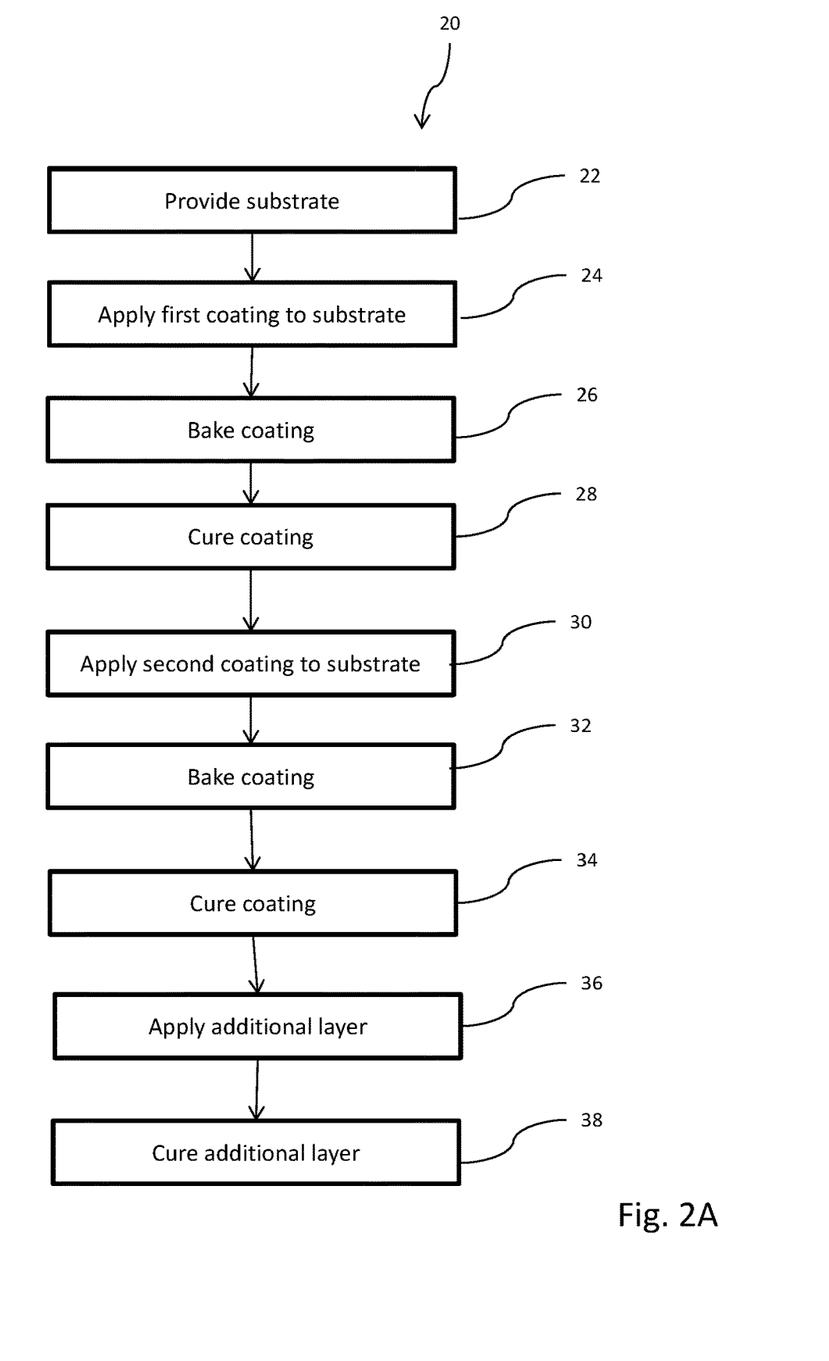
FIG. 2A illustrates an exemplary method of forming a coated sapphire wafer.

Referring next to FIG. 2A, an exemplary method 20 of forming a coated sapphire wafer is illustrated. In block 22, a substrate, such as sapphire wafer 10 (FIG. 1) is provided.

In block 24, a liquid coating formulation is applied to a first side of the substrate. In some embodiments, the liquid coating formulation comprises a solvent and a silicon-based material, as described below. Exemplary methods for applying the liquid coating formulation include spin coating, spray coating, dip coating, slit coating, roller coating, meyer rod coating, casting, and the like. In one exemplary embodiment, the liquid coating formulation is applied by spin coating at a speed as low as about 2000 rpm, about 3000 rpm, about 3300 rpm, as high as about 3500 rpm, 4000 rpm, about 5000 rpm, or within any range defined between any two of the foregoing values, such as 2000 rpm to 5000 rpm, 3000 rpm to 4000 rpm, or 3300 rpm to 3500 rpm.

In block 26, the coated substrate is baked to remove at least a portion or all of the solvent from the liquid coating formulation. In some embodiments, the baking step is as short as 1 minute, 5 minutes, 10 minutes, 15 minutes, as long as 20 minutes, 30 minutes, 45 minutes, 60 minutes, or longer, or within any range defined between any two of the foregoing values, such as 1 minute to 60 minutes, 5 minutes to 30 minutes, or 10 minutes to 15 minutes. In some embodiments the baking step is conducted at a temperature as low as 100° C., 200° C., 220° C., as high as 250° C., 275° C., 300° C., 320° C., 350° C., or higher, or within any range defined between any two of the foregoing values, such as 100° C. to 350° C., 200° C. to 300° C., or 220° C. to 275° C. In some embodiments, the baking is performed by heating the coated substrate for about 10 minutes at about 200° C.

In block 28, the first coating 14 is cured (see FIG. 1). Exemplary curing methods include thermal treatment, light curing, UV curing, and microwave curing.

In one exemplary embodiment, the curing is performed by heating the coated substrate for as short as 3 minutes, 5 minutes, as long as 10 minutes, or 15 minutes, at a temperature as low as 500° C., 550° C., 600° C., 650° C., as high as, 700° C., 750° C., 800° C.

In one exemplary embodiment, the curing is performed by heating the coated substrate for as short as 3 minutes, 5 minutes, as long as 10 minutes, or 15 minutes, or within any range defined between any two of the foregoing values, such as 3 minute to 15 minutes or 5 minutes to 10 minutes. In some embodiments the curing is performed by heating the coated substrate to a temperature as low as 500° C., 550° C., 600° C., 650° C., as high as 700° C., 750° C., 800° C., or within any range defined between any two of the foregoing values, such as 500° C. to 800° C., 600° C. to 800° C., or 650° C. to 700° C. In some embodiments, the curing is performed by heating the coated substrate for about 5 minutes at about 700° C.

In some exemplary embodiments, the heating is performed using an oven, furnace, or hot plate.

As shown in FIG. 2A, in some exemplary embodiments, a second coating is applied to the substrate, as shown in block 30. In a more particular embodiment, the second coating is applied to a second side of the substrate, wherein the second side is opposite the first side of the substrate. Exemplary methods for applying the second liquid coating formulation include spin coating, spray coating, dip coating, slit coating, roller coating, Meyer rod coating, casting, and the like. In one exemplary embodiment, the second liquid coating formulation is applied by spin coating at a speed as low as about 2000 rpm, about 3000 rpm, about 3300 rpm, as high as about 3500 rpm, 4000 rpm, about 5000 rpm, or within any range defined between any two of the foregoing values, such as 2000 rpm to 5000 rpm, 3000 rpm to 4000 rpm, or 3300 rpm to 3500 rpm.

In block 32, the coated substrate is baked to remove at least a portion or all of the solvent from the second liquid coating formulation. In some embodiments, the baking step is performed as described above with respect to block 26.

In block 34, the second coating is cured. In some embodiments, the curing step is performed as described above with respect to block 28.

In some exemplary embodiments, an additional layer 18 (see FIG. 1) is applied to the substrate, as shown in block 36. As shown in block 36, in some exemplary embodiments, an additional layer 18 is applied to at least one of the first coating layer 14 and the second coating layer 16. In some exemplary embodiments, the additional layer is an anti-fingerprint layer applied by wet coating or by physical deposition. Additional exemplary anti-fingerprint coatings processes are disclosed in PCT Publication WO 2015/038454, entitled POLY FLUORINE-CONTAINING SILOXANE COATINGS, the disclosure of which is hereby incorporated by reference in its entirety.

In block 38, the additional layer 18, if present, may be cured (see FIG. 1). Curing the additional layer 18 may be performed at a temperature as low as 25° C., 50° C., 75° C., 100° C., as high as 150° C., 175° C., 200° C., 250° C., or within any range defined between any two of the foregoing values, such as 50° C. to 150° C., 100° C. to 200° C., or 75° C. to 175° C. The duration of the curing step may be as short as 0 minutes, 0.5 minutes, 5 minutes, 10 minutes, as long as 20 minutes, 25 minutes, 30 minutes, 60 minutes, or within any range defined between any two of foregoing values, such as 0 minutes to 30 minutes, 5 minutes to 30 minutes or 10 minutes to 25 minutes.

In other exemplary embodiments, the additional layer may be applied through a process, such as physical vapor deposition (PVD), that does not require curing.

Figure 2B:
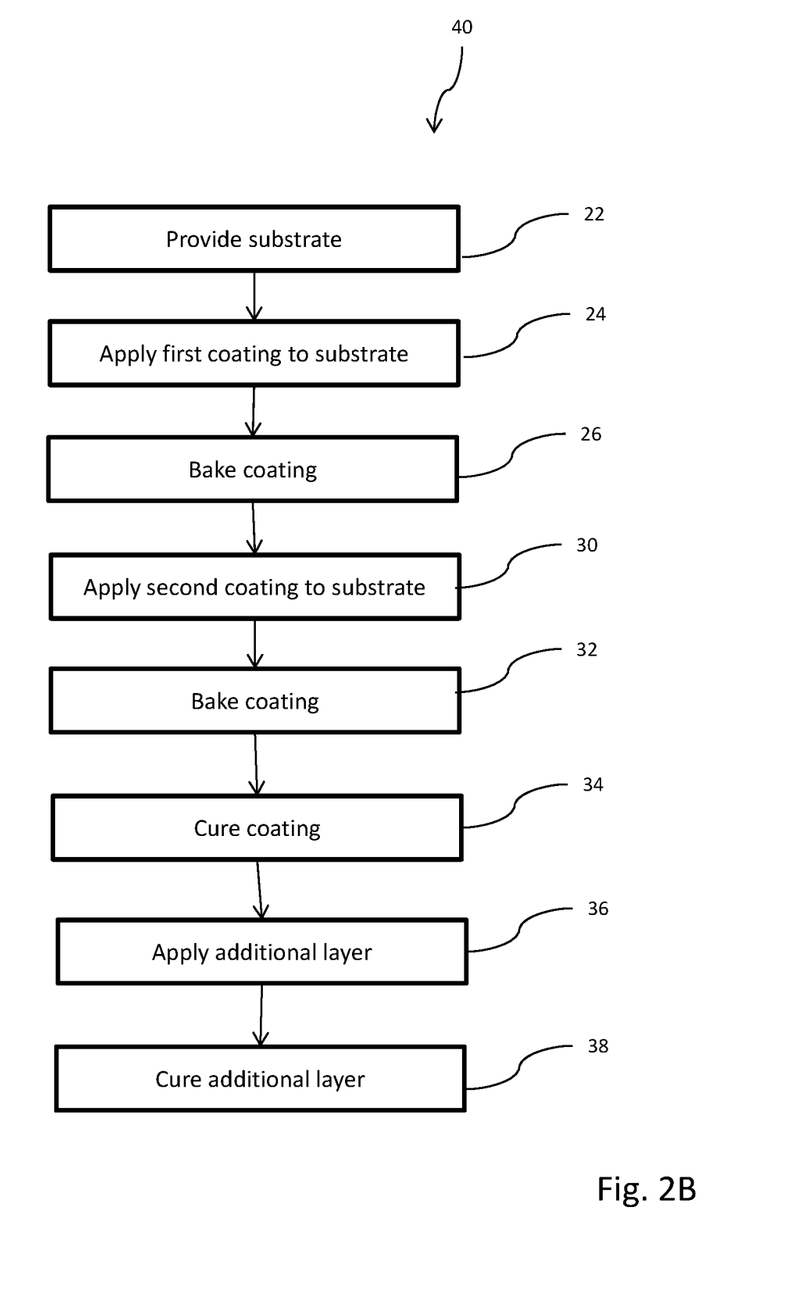
FIG. 2B illustrates another exemplary method of forming a coated sapphire wafer.

Referring next to FIG. 2B, another exemplary method 40 of forming a coated sapphire wafer is illustrated. In some embodiments, method 40 is similar to method 20, and similar numbers are used to indicate similar blocks. In block 22, a substrate, such as sapphire wafer 10 (FIG. 1) is provided. In block 24, a liquid coating formulation is applied to a first side of the substrate. In block 26, the coated substrate is baked to remove at least a portion or all of the solvent from the liquid coating formulation. Method 40 then proceeds to block 30, where a second coating is applied to the substrate. In a more particular embodiment, the second coating is applied to a second side of the substrate, wherein the second side is opposite the first side of the substrate. In block 32, the coated substrate is baked to remove at least a portion or all of the solvent from the second liquid coating formulation. In some embodiments, the baking step is performed as described above with respect to block 26. In block 34, the first and second coatings are cured. In some embodiments, the curing step is performed as described above with respect to block 28 of method 20. In some exemplary embodiments, an additional layer 18 (see FIG. 1) is applied to the substrate, as shown in block 36. In block 38, the additional layer 18, if present, may be cured (see FIG. 1). In other exemplary embodiments, the additional layer may be applied through a process, such as physical vapor deposition (PVD), that does not require curing.

Figure 2C:
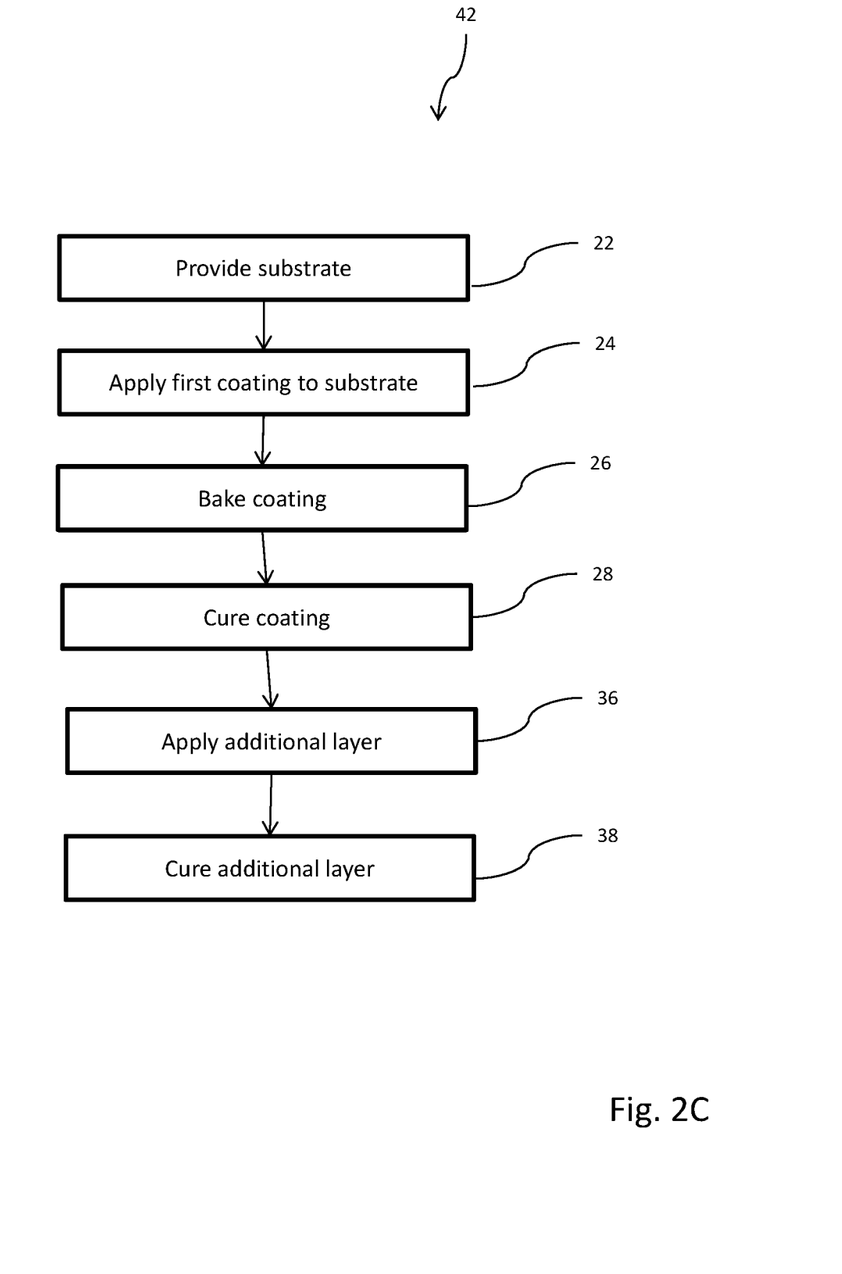
FIG. 2C illustrates still another exemplary method of forming a coated sapphire wafer.

Referring next to FIG. 2C, still another exemplary method 42 of forming a coated sapphire wafer is illustrated. In some embodiments, method 40 is similar to method 20 and/or method 40, and similar numbers are used to indicate similar blocks. In block 22, a substrate, such as sapphire wafer 10 (FIG. 1) is provided. In block 24, a liquid coating formulation is applied to a first side of the substrate. In block 26, the coated substrate is baked to remove at least a portion or all of the solvent from the liquid coating formulation. In block 28, the coating is cured as described above with respect to method 20. In some exemplary embodiments, an additional layer 18 (see FIG. 1) is applied to the substrate, as shown in block 36. In block 38, the additional layer 18, if present, may be cured (see FIG. 1). In other exemplary embodiments, the additional layer may be applied through a process, such as physical vapor deposition (PVD), that does not require curing.

Figure 2D:
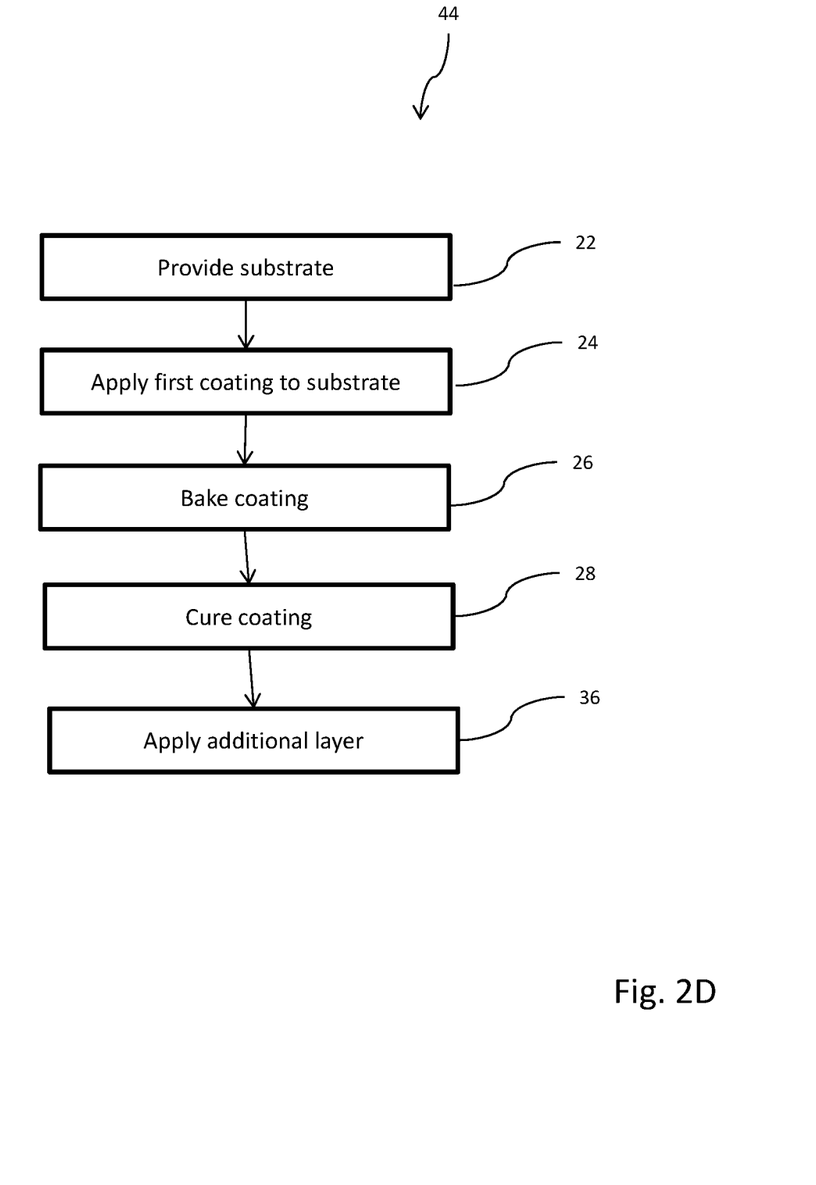
FIG. 2D illustrates yet still another exemplary method of forming a coated sapphire wafer.

Referring next to FIG. 2D, yet still another exemplary method 44 of forming a coated sapphire wafer is illustrated. In some embodiments, method 40 is similar to method 20, method 40, and/or method 42, and similar numbers are used to indicate similar blocks. In block 22, a substrate, such as sapphire wafer 10 (FIG. 1) is provided. In block 24, a liquid coating formulation is applied to a first side of the substrate. In block 26, the coated substrate is baked to remove at least a portion or all of the solvent from the liquid coating formulation. In block 28, the coating is cured as described above with respect to method 20. In some exemplary embodiments, an additional layer 18 (see FIG. 1) is applied to the substrate, as shown in block 36.

I. Polysiloxane Formulation

In one exemplary embodiment, the polysiloxane formulation for forming the anti-reflective coating includes one or more solvents and one or more silicon-based materials.

a. Silicon-Based Materials

The formulation includes one or more crosslinkable silicon-based materials that can be crosslinked to form the anti-reflective polysiloxane coating.

Exemplary silicon-based materials comprise one or more crosslinkable siloxane oligomers formed from one or more organoalkoxysilane precursors via hydrolysis and condensation reactions. Exemplary organoalkoxysilane precursors include tetraethylorthosilicate (TEOS), methyltrimethoxysilane (MTMOS), methyltriethoxysilane (MTEOS), dimethyldiethoxysilane (DMDEOS), phenyl triethoxysilane (PTEOS), vinyltriethoxysilane (VTEOS), dimethyldimethoxysilane, phenyltrimethoxysilane, and combinations of the foregoing.

In some embodiments, the one or more crosslinkable siloxane oligomers comprise a methylsiloxane oligomer. In some embodiments, methyl groups comprise as little as 0 wt. %, 1 wt. %, 2 wt. %, 5 wt. %, as great as 10 wt. %, 15 wt. %, 20 wt. % of the crosslinkable siloxane oligomers, or may be within any range defined between any two of the foregoing values, such as from 1 wt. % to 20 wt. %, 2 wt. % to 15 wt. %, or 5 wt. % to 15 wt. %. In some embodiments, the methyl groups comprise about 10 wt. % of the total crosslinkable siloxane oligomers.

In some embodiments, the crosslinkable siloxane oligomers have a weight average molecular weight ($M_w$) as little as 500 Dalton, 1000 Dalton, 1250 Dalton, 1500 Dalton, as high as 1600 Dalton, 1750 Dalton, 2000 Dalton, 3000 Dalton, 5000 Dalton, or within any range defined between any two of the foregoing values, such as 500 Dalton to 5000 Dalton, or 1000 Dalton to 3000 Dalton, or 1500 Dalton to 2000 Dalton. In some embodiments, the crosslinkable siloxane oligomers have a polydispersity index (weight average molecular weight/number average molecular weight) as little as 1.10, 1.12, 1.15, as high as 1.16, 1.18, 1.20, or within any range defined between any two of the foregoing values, such as 1.10 to 1.20, 1.12 to 1.18, or 1.15 to 1.18. In some embodiments, the crosslinkable siloxane oligomers have a weight average molecular weight of about 1500 and a polydispersity index of about 1.16.

In some embodiments, the crosslinkable siloxane oligomers are provided as a plurality of particles having a particle diameter as little as 1 nm, 2 nm, 3 nm, 5 nm, as great as 10 nm, 30 nm, 40 nm, 50 nm, or within any range defined between any two of the foregoing values, such as from 1 nm to 50 nm, 2 nm to 40 nm, or 3 nm to 30 nm. In some embodiments, the particles have a relatively uniform particle diameter. In another exemplary embodiment, MTEOS is used together with TEOS as a precursor for forming the antireflective coating.

Exemplary silicon-based materials include the ACCUGLASS® T-11 Spin-on Glass series of materials available from Honeywell International, Inc., including materials 111, 211, and 311. The ACCUGLASS® T-11 materials comprise crosslinkable methylsiloxane in a solvent. Other exemplary silicon-based materials are disclosed in U.S. Pat. No. 8,784,985, entitled ANTI-REFLECTIVE COATINGS FOR OPTICALLY TRANSPARENT SUBSTRATES, the disclosure of which is hereby incorporated by reference in its entirety.

In one exemplary embodiment, formulation comprises the one or more silicon-based materials in an amount as little as 1.0 wt. %, 1.5 wt. %, 2.0 wt. %, as great as 10 wt. %, 15 wt. %, 20 wt. %, based on the total weight of the formulation, or within any range defined between any two of the foregoing values, such as 1.0 wt. % to 20 wt. %, 1.5 wt. % to 15 wt. %, or 2.0 wt. % to 10 wt. %.

b. Solvent

The formulation includes one or more solvents. Exemplary solvents include water, ketones such as acetone, diethyl ketone, and methyl ethyl ketone, alcohols such as methanol, ethanol, isopropyl alcohol, n-propanol, n-butanol, esters such as butyl acetate, ethyl acetate, etc., ether esters (e.g., propylene glycol methyl ether acetate, etc.) and mixtures thereof. In one exemplary embodiment, polar solvents with a boiling point between 50-100° C. are used. In another exemplary embodiment, the solvent comprises ethanol.

In one exemplary embodiment, the present formulation comprises a total amount of solvent as little as 80 wt. %, 81 wt. %, 82 wt. %, 85 wt. %, 88 wt. %, as great as 90 wt. %, 92 wt. %, 95 wt. %, 97 wt. %, 98 wt. %, 99 wt. %, based on the total weight of the formulation, or within any range defined between any two of the foregoing values, such as 80 wt. % to 99 wt. %, 81 wt. % to 98 wt. %, 82 wt. % to 97 wt. %, 85 wt. % to 97 wt. %, or 88 wt. % to 97 wt. %.

c. Other Additives

The formulation may further include one or more additives.

In some exemplary embodiment, the formulation includes one or more catalysts to improve the crosslinking of the silicon-based material. Exemplary catalysts include organic substituted ammonium hydroxide, such as TMAH (tetramethylammonium hydroxide), or organic substituted ammonium salts, such as TMAN (tetramethylammonium nitride). In some embodiments, the formulation comprises a total amount of catalyst as little as 0 wt. %, 0.001 wt. %, 0.01 wt. %, as great as 0.1 wt. %, 0.2 wt. %, 1.0 wt. %, based on the total weight of the formulation, or within any range defined between any two of the foregoing values, such as 0 wt. % to 1.0 wt. %, 0.01 wt. % to 0.1 wt. %, or 0.001 wt. % to 0.1 wt. %.

In some exemplary embodiments, the formulation includes one or more surfactants to improve the leveling of the silicon-based materials on sapphire substrate. Exemplary surfactants include silicone based surface additives such as: BYK-307, BYK-306, BYK-222 provided by BYK Chemie GmbH, fluorosurfactants, such as Novec™ Fluorosurfactant FC-4430 provided by 3M, or Tego® Flow 300 provided by Evonik Industries AG. In some embodiments, the formulation comprises a total amount of surfactant as little as 0 wt. %, 0.001 wt. %, 0.01 wt. %, as great as 0.1 wt. %, 0.2 wt. %, 1.0 wt. %, based on the total weight of the formulation, or within any range defined between any two of the foregoing values, such as 0 wt. % to 1.0 wt. %, 0.01 wt. % to 0.1 wt. %, or 0.001 wt. % to 0.1 wt. %.

II. Coating

In some exemplary embodiments, the polysiloxane formulation forms a coating on a substrate, such as a sapphire wafer.

In some exemplary embodiments, the coating has a thickness as little as 50 nm, 60 nm, 70 nm, 80 nm, 90 nm, as great as 100 nm, 110 nm, 120 nm, 130 nm, 140 nm, 150 nm, or within any range defined between any two of the foregoing values, such as 50 nm to 150 nm or 70 nm to 120 nm.

In some exemplary embodiments, a sapphire substrate coated on one or both sides with the formulation has a transmittance to light in the visible optical wavelength range from 380 to 800 nm. Transmittance is measured with the spectrophotometer with a certain set of f-number beams in their sample compartments (e.g., f/10, f/4, etc.) and a different minimum sample sizes in their beams.

The transmittance test method follows the testing methodology of ASTM D1003. The average transmittance of the 380-800 nm spectrum was measured using a Cary4000 spectrophotometer, the average transmittance of the 400 nm-700 nm spectrum and haze for a bare sapphire were measured using a BYK Haze Gard. Typically, a 100% transmittance calibration scan over the spectral range of interest with no sample is conducted followed by a 0% transmittance scan with an opaque sample in the sample beam that does not interfere with the reference beam in the same sample compartment. The transmittance spectrum of the sample of interest is then scanned and measured. In some embodiments, the optical transmittance is as high as 85%, 86%, 88%, 89%, 90%, 92%, 95%, 97%, 98%, 99%, or higher, or within any range defined between any two of the foregoing values, such as 92% to 99%, or 98% to 99%. In some exemplary embodiments, the optical transmittance is about 90% or higher, or about 92% or higher.

In some exemplary embodiments, a sapphire substrate coated on one or both sides with the formulation has an increased gain, defined as an average transmittance to light compared to the average transmittance of an uncoated sapphire substrate. In some embodiments, the gain is at least 1%, 2%, 3%, 4%, 5%, 6%, 7%, 8%, 9%, 10%, 11%, 12%, or higher, or within any range defined between any two of the foregoing values, such as 1% to 12% or 5% to 12%.

In some exemplary embodiments, the polysiloxane formulation forms a coating having a refractive index that is as little 1.23, 1.25, 1.27, 1.30, 1.31, 1.32, as great as 1.33, 1.35, 1.37, 1.40, 1.45, or within any range defined between any two of the foregoing values, such as from less than 1.23 to 1.45 or 1.30 to 1.35.

Mohs hardness of the coating is measured for the coating as well. The Mohs hardness of each sample was measured using a Mohs hardness meter made by ShenZhen KeJiaMei Co., Ltd. Mohs hardness is determined by comparing the scratch resistance of the coating and measuring such resistance on the Mohs hardness meter. In some exemplary embodiments, the coating has a Mohs hardness as little as 4, 5, as great as 6, 7, or 8, or within any range defined between any two of the foregoing values, such 4 to 8 or 4 to 7. In one more particular embodiment, the coating has a Mohs hardness of about 7, such as 6.5 to 7.5.

In some exemplary embodiments, the coating has a relatively high hydrophilicity due to an abundant amount of Si—OH groups. In one embodiment, the coating is used as a base for a further application of one or more anti-fingerprint coatings, which provide anti-fingerprint coating functionality. In a further exemplary embodiment, the anti-fingerprint coating may be applied directly to the coating on the sapphire substrate without the need for a buffer layer between the coating and the anti-finger print coating, at least in part due to the high hydrophilicity of the coating.

The molecular structure of an anti-fingerprint coating generally includes a siloxane/silane. Typically, the substrate to which the anti-fingerprint coating is applied needs to have an additional layer, or a buffer layer, applied to the anti-reflective layer, where the additional layer has enough Si—OH groups to bond with the siloxane/silane of the anti-fingerprint coating. Advantageously, however, when the present anti-fingerprint coating is applied to the anti-reflective coating, the siloxane/silane of the anti-fingerprint coating will react with the Si—OH groups of the anti-reflective coating and form bonds therebetween. The present anti-reflective coating has enough Si—OH groups and easily bonds with the anti-fingerprint coating, thereby foregoing the need for a buffer layer and reducing supply and manufacturing costs in the process.

Contact angle may be measured according to ASTM D7334-08 with any suitable commercially available instrument, such as the "Drop Shape Analysis" system (DSA10), available from Kruss GmbH of Hamburg, Germany. In some embodiments, the coating has a water contact angle as little as 10°, 8°, 5°, 4°, or less, or within any range defined between any two of the foregoing values, such as 10° to 4° or 5° to 4°. In some embodiments, the coating has a water contact angle of less than 5°. In some exemplary embodiments, the coating is suitable for use a primer coating for an anti-fingerprint coating or layer. Without wishing to be held by any particular theory, it is believed that a relatively high concentration of Si—OH groups on the surface of the anti-reflective coating provide better anti-fingerprint coating performance by better alignment between the Si—OH groups and the anti-reflective coating.

In one embodiment, the present coating provides an adhesive function for filling and/or fixing microcracks of the sapphire substrate. Before the coating is baked and cured, the coating is in liquid form and is applied within the microcracks such that the coating substantially fills the microcracks. After baking and curing, the liquid coating becomes solid such that the microcrack is no longer present along the surface of the substrate. Moreover, the cured coating may have similar physical properties as the sapphire substrate, enhancing the strength of the coated substrate.

In some exemplary embodiments, the coating has a haze value as measured by ASTM D1003 as little as 0.13%, 0.10%, 0.08%, 0.06%, 0.03%, or less, or within a range defined between any two of the foregoing values, such as 0.13% to 0.03%, 0.10% to 0.03%, or 0.08% to 0.03%.

In some exemplary embodiments, the coating is transparent and clear, and has excellent uniformity when viewed under a microscope. In some exemplary embodiments, the coating uniformity is characterized by ellipsometer or profiler at different points of the substrate.

In some exemplary embodiments, the coated substrate includes an additional layer 18, wherein the additional layer is an anti-fingerprint coating. In some exemplary embodiments, the anti-fingerprint coating has a water contact angle as low as 90°, 95°, 100°, as high as 110°, 120°, 125°, or within any range defined between any two of the foregoing values, such 90° to 125°. In some exemplary embodiments, the anti-fingerprint coating has an oleic acid contact angle as low as 60°, 65°, 70°, as high as 80°, 85°, 90°, or within any range defined between any two of the foregoing values, such 60° to 90°. In some embodiments, a scratch resistance of the anti-fingerprint coating can be increased by curing the coating at a higher temperature.

EXAMPLES

Examples 1 and 2

A sample of ACCUGLASS® T-11 (211) Spin-on Glass material having about 7.4 wt. % to about 7.9 wt. % solids, available from Honeywell International, Inc. containing about 10 wt. % methyl groups was diluted with either ethanol or isopropyl alcohol in the amounts indicated in Table 1 below.

ACCUGLASS® T-11 is a coating solution comprising solid components and solvents. The solid components include the products from the hydrolysis-polymerization reaction of tetraethoxylsilane (TEOS) and methyltriethoxylsilane (MTEOS).

As shown in Table 1, Example 1 and Example 2 provide a relatively high amount of solvent. Without wishing to be held to any particular theory, it is believed that a relatively high amount of a low boiling point solvent such as ethanol, isopropyl alcohol, or acetone allows the formation to be applied with a precise thickness in a single application of the coating, while a relatively low amount of solvent would not allow a precision thickness of the coating, and multiple applications may be required. It is further believed that a relatively high boiling point solvent would lead to a non-uniform coating following baking.

TABLE 1

| Formulation of Examples 1 and 2 | | |
| --- | --- | --- |
|  | Example 1 | Example 2 |
| ACCUGLASS T-11(211) | 15 g | 15 g |
| Ethanol | 15 g | — |
| Isopropyl alcohol | — | 15 g |

For each Example, the solution was stirred to homogeneous at 25° C. for 10 minutes, and a transparent liquid was obtained.

Example 3

A 1.5 mL sample of Example 1 was spin coated on one side of a round sapphire substrate with a diameter of 50 mm. The coated sample was baked on a hot plate for 10 minutes at 200° C. The sample was then cured in a muffle oven for 5 minutes at 700° C.

Example 4

A 1.5 mL sample of Example 1 was spin coated on one side of a round sapphire substrate with a diameter of 50 mm. The coated sample was baked on a hot plate for 10 minutes at 200° C. The opposite side of the sapphire substrate was then spin coated with a 1.5 mL sample of Example 1 and baked on a hot plate for 10 minutes at 200° C. The sample was then cured in a muffle oven for 5 minutes at 700° C.

Example 5

A 5 mL sample of Example 1 was spin coated on one side of a sapphire made mobile phone cover glass with a size of 5 inches. The sample was baked on a hot plate for 10 minutes at 200° C. The sample was then cured in a muffle oven for 5 minutes at 700° C.

Example 6

A 1.5 mL sample of Example 2 was spin coated on one side of a round sapphire substrate with a diameter of 50 mm. The coated sample was baked on a hot plate for 10 minutes at 200° C. The sample was then cured in a muffle oven for 5 minutes at 700° C.

Example 7

A 1.5 mL sample of Example 1 was spin coated on one side of a round sapphire substrate with a diameter of 50 mm.

The coated sample was baked on a hot plate for 10 minutes at 200° C. The sample was then cured in a muffle oven for 15 minutes at 500° C.

Example 8

The transmittance of a bare sapphire, Example 3, and Example 4 within the spectrum from 380 nm to 800 nm was measured using a Varian UV-VIS Cary4000 spectrophotometer. The results are provided in FIG. 3.

Figure 3:
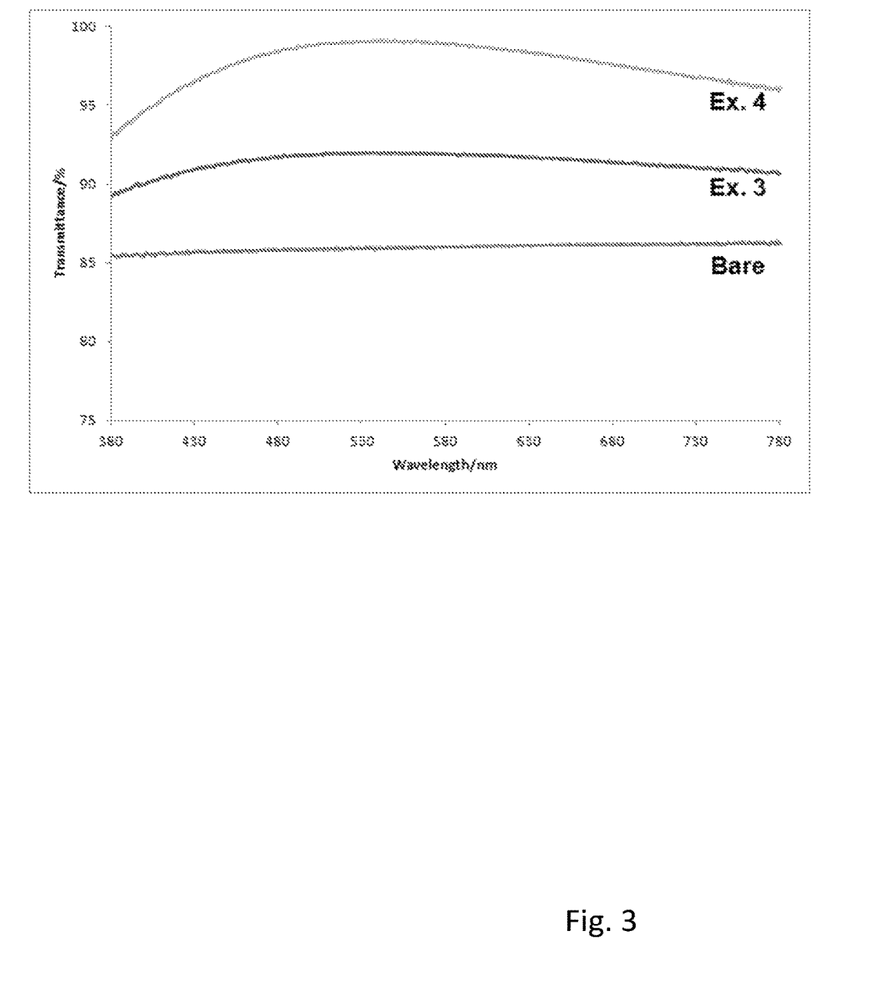
FIG. 3 is related to Example 6 and shows the percent transmittance of a bare sapphire, Example 3, and Example 4 within the spectrum from 380 nm to 800 nm.

As shown in FIG. 3, coating a single side of the sapphire substrate in Example 3 increased the average transmittance from an average of about 86.0% to about 91.4% across the measured spectrum, a gain of about 5.4%. Coating both sides of the sapphire substrate further increased the transmittance to an average of about 97.6% a gain of about 11.6%.

Example 9

For each of a bare sapphire and Examples 3-5 and 7, the average transmittance of the 380-800 nm spectrum was measured using a Cary4000 spectrophotometer, the average transmittance of the 400 nm-700 nm spectrum and haze for a bare sapphire were measured using a BYK Haze Gard. The average transmittance of Example 6 in the 400 nm-700 nm spectrum was also measured. The Mohs hardness of each sample was measured using a Mohs hardness meter made by ShenZhen KeJiaMei Co., Ltd. The results are provided in Table 2.

TABLE 2

Average Transmittance, Haze, and Mohs Hardness

| | Average Transmittance by Cary4000 (380-800 nm) | Average Transmittance by BYK (400-700 nm) | % Haze by BYK | Mohs Hardness |
|---|---|---|---|---|
| Bare sapphire | 86.5% | 87.5% | 0.13 | 9 |
| Example 3 | 92.1% | 93.1% | 0.08 | 7 |
| Example 4 | 98.0% | 99.0% | 0.03 | 7 |
| Example 5 | 92.1% | 93.1% | 0.06 | 7 |
| Example 6 | — | 93.3% | — | — |
| Example 7 | 92.3% | 93.4% | 0.07 | 5 |

As shown in Table 2, coating a single side of the sapphire substrate in Example 3 significantly increased the average transmittance while decreasing the percent haze. Coating both sides of the sapphire substrate further increased the transmittance while further decreasing the percent haze.

As further shown in Table 2, the Examples 3-5, which were cured at a relatively high temperature of 700° C., had a hardness of 7, while Example 7, which was cured at 500° C., had a hardness of 5. Generally, curing temperature is directly related to the hardness of the coating. A higher curing temperature results in a higher crosslink rate of the coating. Greater crosslink rate leads to a denser molecular structure and therefore, returns a higher hardness value.

Examples 10 and 11

To create Example 10, a sample of Example 5 was coated with an OPTOOL DSX anti-fingerprint coating available from Daikin on top of the coated side of the substrate using physical vapor deposition (PVD).

To create Example 11, a sample of Example 5 was coated with a 10 nm thickness of SiO$_2$ using physical vapor deposition, followed by a subsequent coating by physical vapor deposition of the SiO$_2$ layer with the OPTOOL DSX anti-fingerprint coating.

Example 12

The water contact angle for a bare sapphire and each of Example 5, Example 10, and Example 11 were measured using a Surface Electro Optics Pheonix 300 contact angle analyzer. The results are provided in Table 4.

TABLE 4

Water Contact Angle for Examples 5, 10, and 11

| | Water contact angle |
|---|---|
| Bare sapphire | 42° C. |
| Example 5 | 4° C. |
| Example 10 | 115° C. |
| Example 11 | 115° C. |

As shown in Table 4, Example 5 (1-side coated) had a very low water contact angle compared to the bare sapphire, while Examples 9 and 10, which included an anti-fingerprint coating, had a much higher water contact angle compared to the bare sapphire. The water contact angle was the same for both Example 9 and Example 10, indicating that the coating under the anti-fingerprint layer in Example 10 provided a suitable primer layer compared to the SiO$_2$ layer in Example 11.

Example 13

A scratching test was performed on Example 10 and Example 11 using a UMT-2 Tribometer from CETR. The test used a 1 kg weight loading with a piece of 1 cm*1 cm Bonstar steel wool adhered to the bottom, and repeated 5000 back and forth cycles of scratching (5000 seconds).

The water contact angle of each sample was measured before and after the scratching test using the Surface Electro Optics Pheonix 300 contact angle analyzer of Example 12. The results are provided in Table 5.

TABLE 5

Before and After Water Contact Angle for Examples 10, and 11

| | Before water contact angle | After water contact angle |
|---|---|---|
| Example 10 | 115° C. | 105° C. |
| Example 11 | 115° C. | 113° C. |

As shown in Table 5, Examples 10 and 11 maintained relatively high water contact angles following the scratching test, indicating a relatively high degree of scratch resistance. The results in Table 5 further indicate that the coating under the anti-fingerprint layer in Example 10 provided a suitable primer layer compared to the SiO$_2$ layer in Example 11.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:
1. A coated substrate comprising:
a sapphire substrate;

an anti-reflective coating comprising a silicon-containing material, wherein the anti-reflective coating has refractive index of 1.23 to 1.45 and a Mohs hardness of at least 4, and wherein the silicon-containing material is formed from one or more crosslinkable organosiloxane oligomers by curing the crosslinkable siloxane oligomers at a temperature of at least 500° C. to form an anti-reflective layer on the sapphire substrate;

a layer comprising $SiO_2$ disposed over the anti-reflective coating; and an anti-fingerprinting coating disposed over the layer comprising $SiO_2$.

2. The coated substrate of claim 1, wherein the coated substrate has a transmittance to light in the visible optical wavelength range from 380 to 800 nm of 90% or higher.

3. The coated substrate of claim 1, wherein the anti-reflective coating has a thickness from 50 nm to 150 nm.

4. The coated substrate of claim 1, wherein the anti-reflective coating has a water contact angle of less than 10°.

5. The coated substrate of claim 1, wherein the one or more crosslinkable siloxane oligomers comprise methylsiloxane oligomers.

6. The coated substrate of claim 5, wherein the methylsiloxane oligomers have a weight average molecular weight of 1000 Dalton to 5000 Dalton.

7. The coated substrate of claim 1, wherein the anti-reflective coating is formed by curing the crosslinkable siloxane oligomers at a temperature of 500° C. to 800° C. for 3 minutes to 15 minutes.

8. The coated substrate of claim 1, wherein the sapphire substrate has opposing first and second surfaces, the anti-reflective coating being in contact with the first surface of the sapphire substrate, the coated substrate further comprising a second anti-reflective coating in contact with the second surface of the sapphire substrate.

9. The coated substrate of claim 8, wherein the second anti-reflective coating has refractive index of 1.23 to 1.45 and a Mohs hardness of at least 4.

10. The coated substrate of claim 1, wherein the anti-reflective coating has a water contact angle of less than 10°, and the anti-fingerprinting coating has a water contact angle from 90° to 150°.

11. The coated substrate of claim 1, wherein the anti-fingerprinting coating has an oleic acid contact angle from 60° to 90°.

12. A display, camera, lens, or optical equipment comprising the coated substrate of claim 1.

13. A method of coating a sapphire substrate with an antireflective coating, the method comprising:
providing a sapphire substrate;
applying a liquid formulation to the substrate to form a coated substrate, wherein the liquid formulation comprises a crosslinkable silicon-based material and a solvent, wherein the crosslinkable silicon-containing material is formed from one or more cross linkable organosiloxane oligomers; and
curing the coated substrate at a temperature of at least 500° C. to form an anti-reflective layer on the sapphire substrate, the anti-reflective layer in the form of a coating having a refractive index of 1.23 to 1.45 and a Mohs hardness of at least 4;
applying a layer comprising $SiO_2$ over the anti-reflective layer; and
applying an anti-fingerprinting coating over the layer comprising $SiO_2$.

14. The method of claim 13, wherein said curing comprises heating the coated substrate at a temperature of at least 700° C.

15. The method of claim 13, wherein the solvent is selected from the group consisting of water, ethanol, isopropyl alcohol, acetone, methanol, n-propanol, n-butanol, methyl ethyl ketone, diethyl ketone, butyl acetate, ethyl acetate, propylene glycol methyl ether acetate, and mixtures thereof.

16. The method of claim 13, wherein the anti-reflective coating has a thickness from 50 nm to 150 nm.

17. The method of claim 13, wherein the anti-reflective coating has a water contact angle of less than 10°.

18. The method of claim 13, wherein the one or more crosslinkable siloxane oligomers comprise methylsiloxane oligomers.

19. The method of claim 13, wherein the methylsiloxane oligomers have a weight average molecular weight of 1000 Dalton to 5000 Dalton.

* * * * *